(12) United States Patent
Manning

(10) Patent No.: US 7,224,464 B2
(45) Date of Patent: May 29, 2007

(54) FOURIER-TRANSFORM SPECTROMETERS

(76) Inventor: Christopher J. Manning, 419 Main/POB 265, Troy, ID (US) 83871

( * ) Notice: Subject to any disclaimer, the term of this patent is extended or adjusted under 35 U.S.C. 154(b) by 0 days.

(21) Appl. No.: 09/922,363

(22) Filed: Aug. 2, 2001

(65) Prior Publication Data

US 2002/0097402 A1 Jul. 25, 2002

Related U.S. Application Data

(60) Provisional application No. 60/288,273, filed on May 2, 2001, provisional application No. 60/242,232, filed on Oct. 17, 2000, provisional application No. 60/222,800, filed on Aug. 2, 2000, provisional application No. 60/119,429, filed on Feb. 9, 1999, and provisional application No. 60/107,060, filed on Nov. 4, 1998.

(51) Int. Cl.
*G01B 9/02* (2006.01)

(52) U.S. Cl. ..................................................... 356/451
(58) Field of Classification Search ......... 356/451–456, 356/FOR. 108, 498, 486, 493
See application file for complete search history.

(56) References Cited

U.S. PATENT DOCUMENTS

| 3,970,389 | A | * | 7/1976 | Mendrin et al. | 356/4.1 |
|---|---|---|---|---|---|
| 4,743,114 | A | * | 5/1988 | Crane, Jr. | 356/451 |
| 4,984,898 | A | * | 1/1991 | Hofler et al. | 356/498 |
| 5,892,786 | A | * | 4/1999 | Lott | 372/50 |
| 5,923,422 | A | * | 7/1999 | Keens et al. | 356/451 |
| 5,949,543 | A | * | 9/1999 | Bleier et al. | 356/451 |
| 5,963,322 | A | * | 10/1999 | Rapp et al. | 356/451 |
| 6,654,125 | B2 | * | 11/2003 | Maynard et al. | 356/451 |

* cited by examiner

*Primary Examiner*—Gregory J. Toatley, Jr.
*Assistant Examiner*—Patrick Connolly

(57) ABSTRACT

A novel tilt-compensated interferometer geometry is described. The design uses tilt- and shear-compensation optics to simultaneously maintain high throughput and precise interferometric alignment, even in the presence of non-ideal scanning motions. The tilt-compensation mechanism consists of a novel beamsplitter/reflector assembly that produces two anti-parallel beams. A variety of enhancements to the basic design are described, providing a family of related interferometer designs. These interferometers have applications in spectrometry, spectral imaging and metrology.

8 Claims, 16 Drawing Sheets

Figure 1A
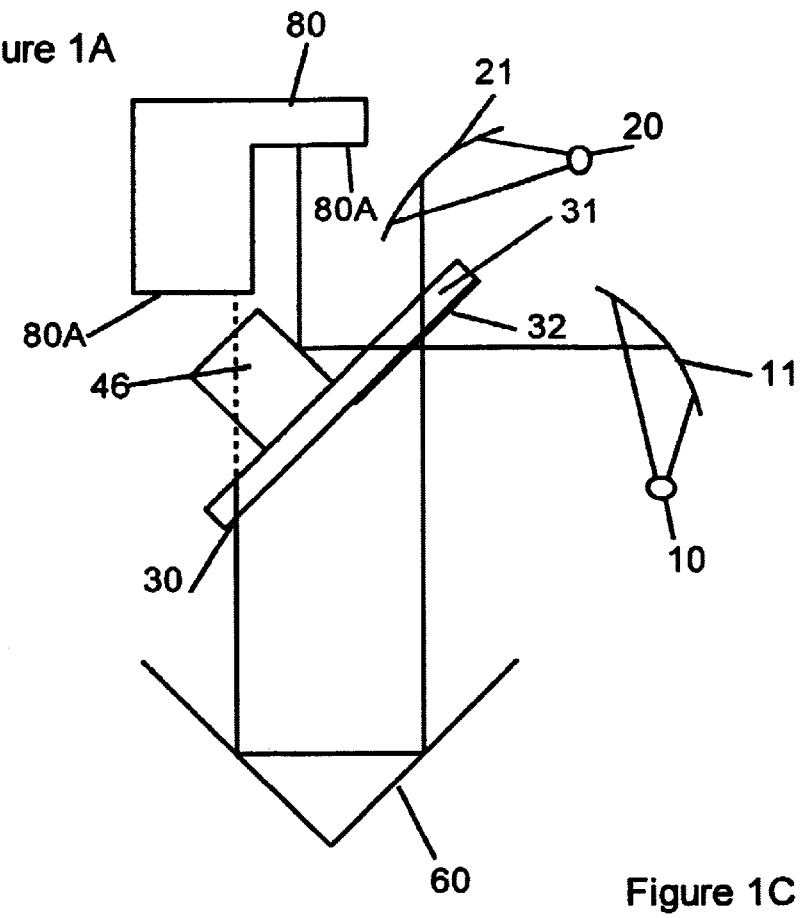
Figure 1B
Figure 1C
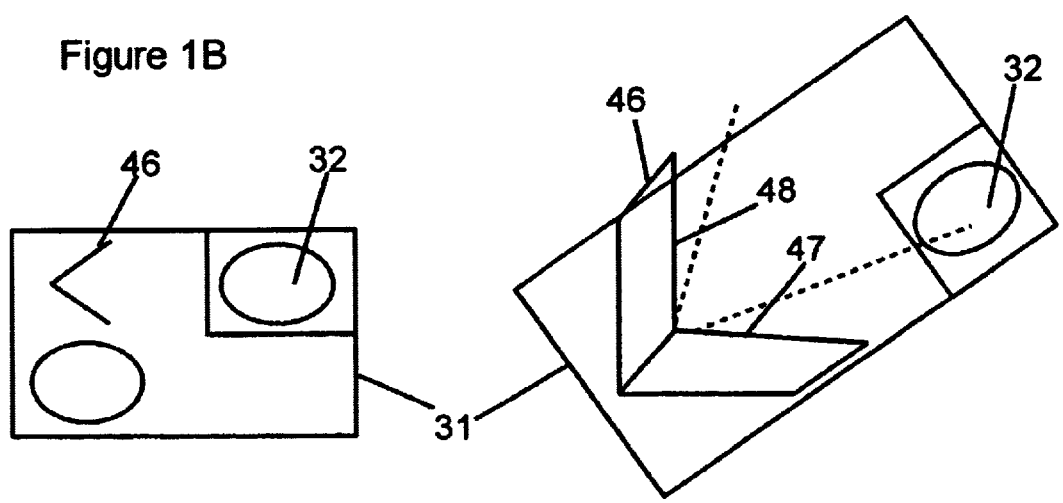

FOURIER-TRANSFORM SPECTROMETERS

GOVERNMENT INTERESTS

This invention was made with Government support under Contract No. NAS1-03033 awarded by the National Aeronautics and Space Administration, as well as Contract No. DAAD1301-P-0012 and Contract No. DAAD-13-02-C-0003 awarded by the United States Army. The U.S. Government has certain rights in this invention.

RELATED APPLICATIONS

This application claims the benefit of Provisional Applications Ser. Nos. 60/222,800, filed Aug. 2, 2000, 60/242,232, filed Oct. 17, 2000 and 60/288,273 filed May. 2, 2001. This application is related to pending formal applications Ser. Nos. 09/299,022 and 09/433,964.

Previous filings by the author are included by reference for the entirety of their disclosures. The first is "Tilt-Compensated Interferometers," filed Apr. 26, 1999, Ser. No. 09/299,022. More are provisional applications Ser. No. 60/107,060, filed Nov. 4, 1998, titled "FT-IR Signal Processing: Part I," Ser. No. 60/119,429, filed Feb. 9, 1999, titled "FT-IR Signal Processing: Part II," a formal application entitled "Signal Processing for Interferometric Spectrometry" Ser. No. 09/433,964 filed Nov. 4, 1999. Further provisional applications which are included for the entirety of their disclosures are titled "Interferometers and Interferometry," Ser. No. 60/228,800, filed Aug. 2, 2000, titled "Interferometers and Interferometry: Part 2," Ser. No. 60/242,232, filed Oct. 17, 2000, and titled "Interferometers and Interferometry: Part 3," Ser. No. 60/288,273 filed May 2, 2001. The book by Griffiths and deHaseth, "Fourier transform spectrometry," ISBN 0-471-09902-3, is also included for the entirety of its content.

BACKGROUND AND SUMMARY OF THE INVENTION

It is an object of the present inventions to provide new interferometers, which are better than prior art in respect to stability, scan speed and cost of manufacture. It is an object of the present inventions to provide signal-processing techniques for interferometry, particularly very rapid scan interferometry. It is an object of the present inventions to improve the state-of-the-art in photometric accuracy of interferometric measurements.

BRIEF DESCRIPTION OF THE DRAWINGS

FIG. 1 shows a diagram of a tilt-compensated interferometric spectrometer.

DETAILED DESCRIPTION

Beamsplitter-roof Reflector Assembly

Figure 2A:
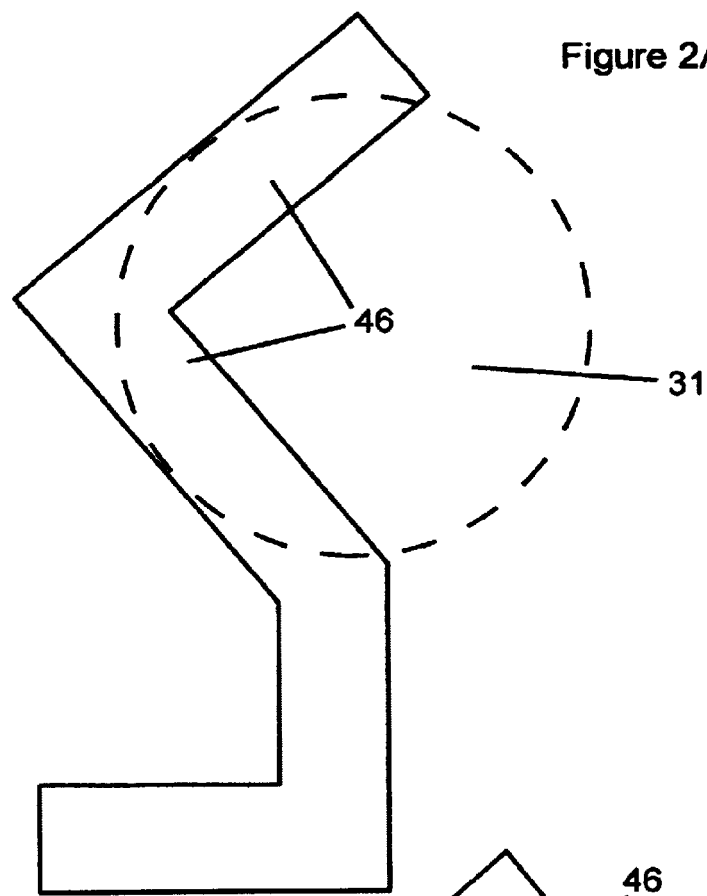
FIG. 2 shows a diagram of the reflector/beamsplitter assembly of FIG. 1.
Figure 2B:
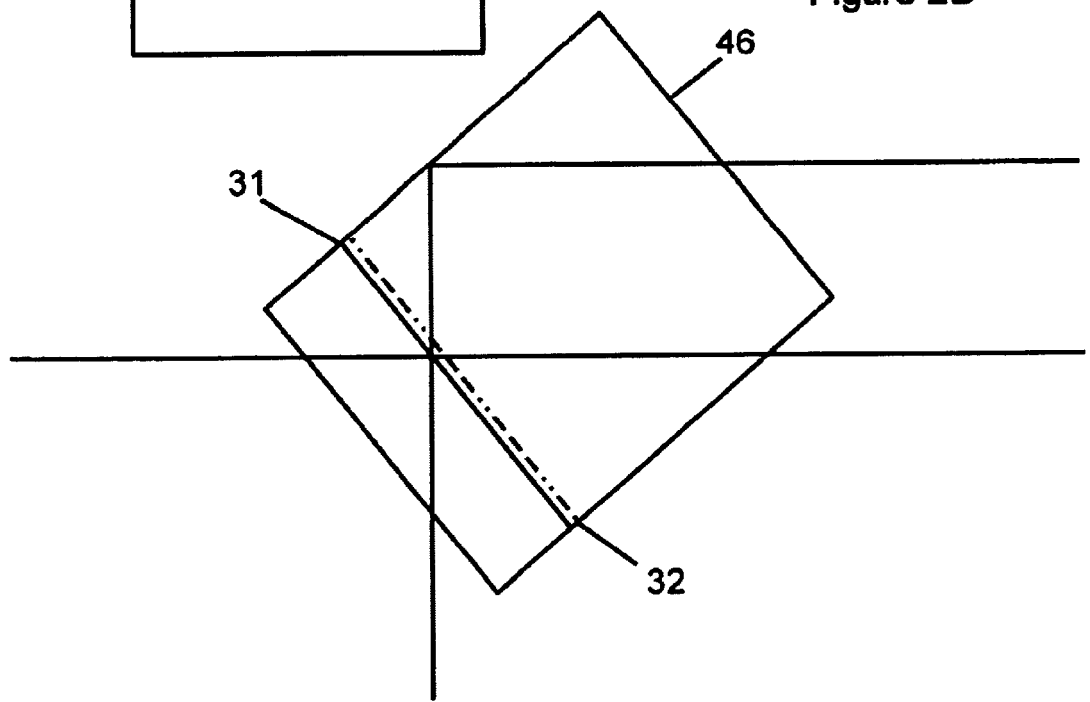

Larsson has described in U.S. Pat. No. 5,650,848 a method for tilt-compensating the scanning mechanism of an interferometer. This prior art extends ideas described by Steel in the early 1960's (see for example, "Interferometry," Cambridge University Press, 1967 W. H. Steel). A new approach substantially increases the throughput that is possible, while making it straightforward to produce very compact reflector assemblies and interferometers. The crux of the new invention is an assembly that consists of a beamsplitter 30 rigidly mounted to a roof reflector 46. By roof reflector, what is meant is a pair of mirror facets which are mutually abutted and mutually perpendicular to interferometric tolerances.

A slight disadvantage of the Michelson interferometer is that the two end mirrors in the arms are susceptible to misalignment with each other and with the beamsplitter. The Jamin (1856), Solomon (U.S. Pat. No. 5,675,412), Turner and Mould (U.S. Pat. No. 5,808,739), Woodruff (U.S. Pat. No. 4,391,525) and several related designs provide an interferometer framework in which slight misalignments of the optical components are completely compensated. Thus, by adding one or more refractive scanning elements to such designs, it is possible to construct an interferometer that preserves intrinsic tilt-compensation and allows variation of path difference with minimum reduction of throughput. If the refractive scanning elements have faces that are parallel and flat, then they will usually not compromise the intrinsic tilt-compensation of an interferometer. The exception is that for interferometers that do not utilize path reversal, the shift caused by such optical scanning elements can cause shear, but not angular, misalignment of the beams in the two arms.

FIGS. 1A, 1B, and 1C shows a diagram of an interferometer which is permanently aligned and for which scanning of the optical path does not require interferometrically accurate rectilinear motion. Radiation from a source 10 impinges on a beamsplitter coating 32 which is supported on one side of a substrate 31. The beam reflected from the coating 32 traverses to a hollow cube corner 60 or other retroreflector where it is directed back through a portion of the beamsplitter substrate 31 which is transparent. This traversal of the beamsplitter substrate 31 provides compensation for the dispersion of the substrate material. The beam then propagates to a flat reflector 80 which returns it on its path back to the beamsplitter 30. The radiation which passes through the beamsplitting coating 32 traverses to a block 46 which is rigidly affixed to the beamsplitter substrate 31. Preferably the block is a hollow roof reflector 46 (two facets at 90 degrees to each other, both of these facets 47 and 48 being oriented at 90 degrees relative to the beamsplitting coating 32). If these two faces 47 and 48 are arranged to be mutually perpendicular to the beamsplitting coating 32 of the substrate 31, then three facets will form a cube corner, or lateral transfer retroreflector. The relevant surfaces of the block 46 and can be coated with reflective materials by a variety of methods. The block 46 is understood to be of interferometrically precise construction such that after a reflection from the block 46 the beam propagating to the flat reflector 80 will have a wavevector that is exactly parallel to the beam from the retroreflector 60. Thus, the flat mirror 80 will return the second beam back to the beamsplitter. It may be discerned that after recombination, both beams will have traversed an exactly equal thickness of the beamsplitter substrate 31.

Two novel methods for fabricating the roof reflector 46 and end mirror 80 of the interferometer are described. These are wire electron-discharge machining (EDM) and fired ceramic. It is thought that by the choice of metals which have very uniform coefficients of expansion, together with wire EDM, that excellent precision substrates can be prepared. Preferred metals are aluminum, invar, and stainless steel. EDM uses an electric arc to erode metal from a part. The electric arc produces very little damage to the part and particularly does not produce stresses in the parts that can cause adverse thermal distortion. Wire EDM can produce surface finishes that are excellent for replication. Replication is a known method for producing high-quality optical surfaces. Another preferred approach to preparation of substrates for the roof reflector 46 is slipcasting of ceramic mixtures and molding of ceramic pastes (i.e., clays). By judicious choice of components, the thermal expansion properties of the ceramic can be tailored to be uniform in all directions and very small. In particular, the addition of ceramic microspheres is preferred because the resulting masses have uniform properties. Some ceramic compositions have particles that have non-uniform properties. If the particles are shaped such that they align preferentially (e.g., flakes or rods), then the macroscopic properties of the resulting masses may not be uniform. After casting or forming, it is understood that the resulting ceramic pieces are fired, then used as substrates for replication.

This inexpensive interferometer is suitable for use with the nutating disk 110 refractive scanning elements described below as well as a variety of other scanning methods. The beamsplitter 30 with anti-parallel reflector assembly 46 may be used as a component of the optical subtraction interferometers described below. The refractive scanning elements 110 described below be inserted at any point in the optical paths in either arm of the interferometer. Motion of the cube corner 60 provides a method for fine-tuning the zero path difference point of the interferometer, or it may be used as the optical path difference scanning element. Alternatively, rotating disks described in U.S. Pat. No. 5,898,495 may be interposed in the path between the beamsplitter 30 and the cube corner reflector 60. It may be necessary to manufacture the final flat reflector 80 in a stair step configuration to compensate the differences in path length of the two arms of the interferometer, thereby insuring that zero path difference is accessible by the scanning element or elements 81. Two views of the beamsplitter 30 with roof reflector 46 are also shown in FIG. 2AB. These clarify the layout of the components on the beamsplitter 31.

Nutating Disk, Refractive Scanning Interferometers

The use of a nutating disk 110 of transparent material as a refractive scanning element of an interferometer is disclosed herein. The principle of optical path difference scanning is that the disk is mounted such that a beam passes through it. During rotation, nutation occurs so that the angle of the disk 110 with respect to the beam varies; consequently the optical path is varied. Such a disk must generally be supported by the edges so as to not block radiation from being transmitted through the disk. The disk is rotated approximately about the axis near where the center of the beam passes through it. The axis of rotation is not exactly perpendicular to the plane passing through the edge of the disk. Thus, the disk 110 nutates or precesses as it rotates thereby causing the optical path through the disk to vary. The disk should have faces that are very flat and parallel such that after passing through the crystal 110 the angle of propagation of the beam is unchanged. In cases where the beam is inverted and passed through the disk a second time, it may be acceptable for the faces to not be parallel, but they should still be flat to interferometric tolerances.

A series of methods for mounting and spinning these disks are disclosed. Two preferred materials for construction of the disks are sodium chloride and potassium bromide, hereafter NaCl and KBr. The disadvantage of these materials is that they are relatively soft. However, calculations show that the deformation of KBr even when spun at 500 revolutions per second, suitable for measuring 1000 interferograms per second, will be quite small. Other materials are also contemplated for use as nutating refractive scanning elements. In particular, germanium is good because of its stiffness and high refractive index. Because of the high refractive index of germanium it should be used with antireflection coatings. Many other materials including silica (quartz), alumina, silicon, zinc sulfide and zinc selenide may be used depending on the desired spectral range, spin rate, retardation and cost range.

The advantage of the nutating arrangement relative to other arrangements described in the literature (e.g., U.S. Pat. No. 5,898,495) is that the throughput can be much higher. In the case of Dybwad's design (U.S. Pat. No. 4,654,530) the substantial advantage of the nutating disk 110 approach is improved duty cycle efficiency; however, the throughput is generally not significantly greater than that obtained by Dybwad. The throughput is significantly greater than that obtained by Davis (U.S. Pat. No. 5,883,713). The disadvantage of Davis' design is that the beam has to pass twice through a salt crystal, which is generally cubic. The duty cycle efficiency is consequently poor, as is the throughput. A point should be made that the rotation axis of the scanning element in Dybwad and Davis are both perpendicular to the scan axis described herein. In both the present case and U.S. Pat. No. 5,898,495, the fundamental scanning mechanism is nutation. Nutation of a transparent disk 110 allows much higher throughput than nutation of a disk mirror. The reason for the difference is that with the disk mirror the beam must be reflected back to the disk mirror for a second reflection. The length of the return path is on the order of 3 d, where d is the beam diameter. In a nutating disk design, the total length in either arm of an interferometer must be on the order of 6 to 10 d. By using a nutating transparent disk, the total length in each arm of an interferometer can be reduced to the order of 3 d. Throughput can thus be approximately 10 times higher because it scales as the square of the number of beam diameters of path traversed in each arm.

Collins, et. al have disclosed in U.S. Pat. No. 3,955,083 the use of a nutating disk as an interferometric shaft angle encoder. The device differs considerably from the present disclosure, both in purpose and implementation. Collins described a disk mounted by a shaft through the center. Nutation of an optical element for the purpose of interferometric modulation has also been published by Crane in U.S. Pat. No. 4,743,114. Crane's art differs considerably from the present disclosure for several reasons. In particular, the motion of the beam produced by nutation of the optical element was not cancelled by a second pass in the reverse direction, but rather exploited as a means of scanning the field of view. Further, Crane's element was a Fabry-Perot etalon rather than a disk for refractive scanning of optical path difference.

Figure 3A:
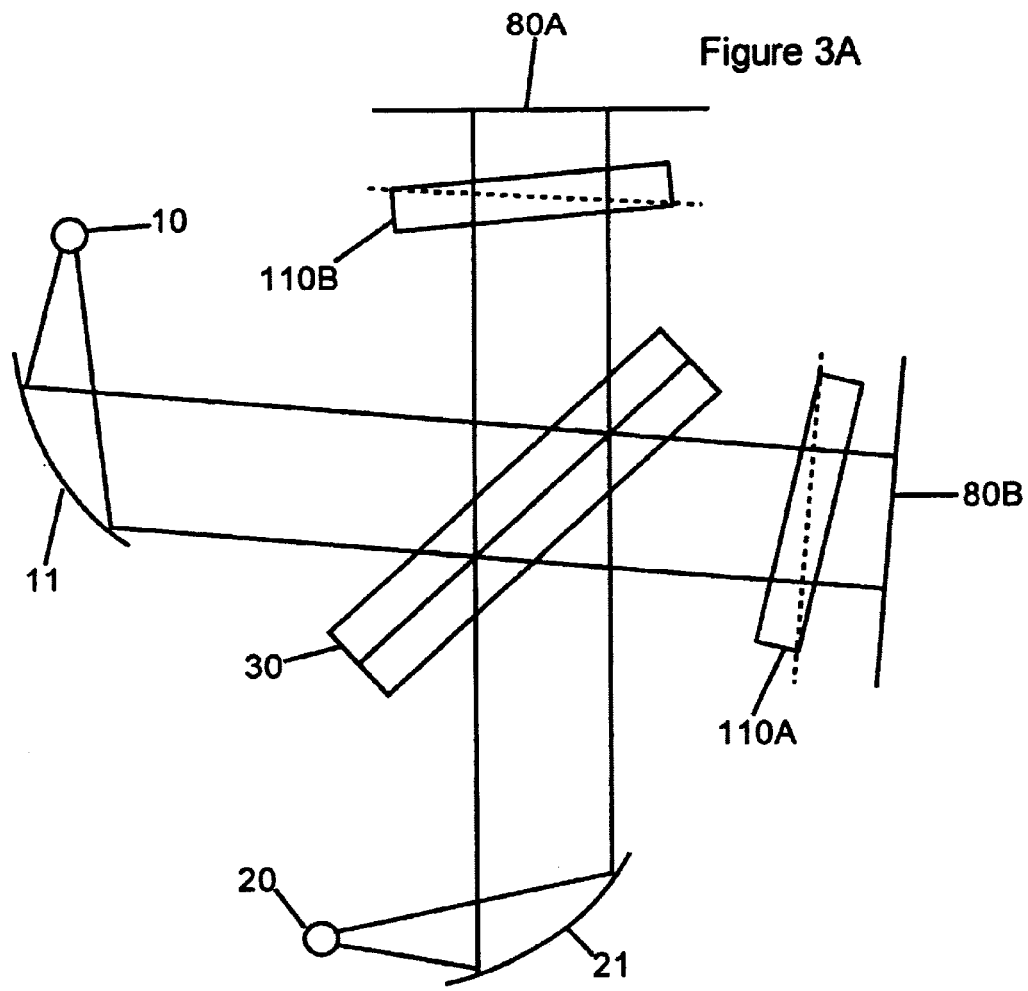
FIG. 3 shows a diagram of a Michelson interferometer incorporating refractive path difference scanners.
Figure 3B:
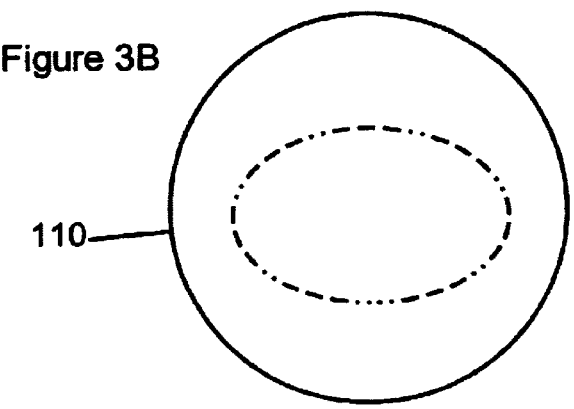

A transparent nutating disk 110 element can be used with a variety of basic interferometer designs, including the standard Michelson. FIG. 3 shows the preferred embodiment with a Michelson interferometer in which one disk 110 is located in each arm. The disks 110A and 110B are oriented at approximately 45 degrees relative to the beams. The disks 110A and 110B are held by their edges in strong support cylinders 126, which may lend some precompression to enhance the stability of the crystal 110 in a centrifugal field. The cylinders may be mounted in ball bearings 136 for rapid rotation. The disk 110 is oriented at a small angle relative to the rotation such that it appears to wobble or nutate during rotation. This has the effect of altering the path length for radiation passing through the crystal 110. A preferred embodiment has the cylinders supported by magnetic levitation. The same means can also drive very rapid rotation, by altering the magnetic fields at the support coils in synchrony. Either one or both disk elements can be rotated. If both are rotated, they may be rotated at the same rate, or at different rates. If one is rotated at twice the rate of the other, then interleaved scans of high and low resolution will be obtained.

Figure 4:
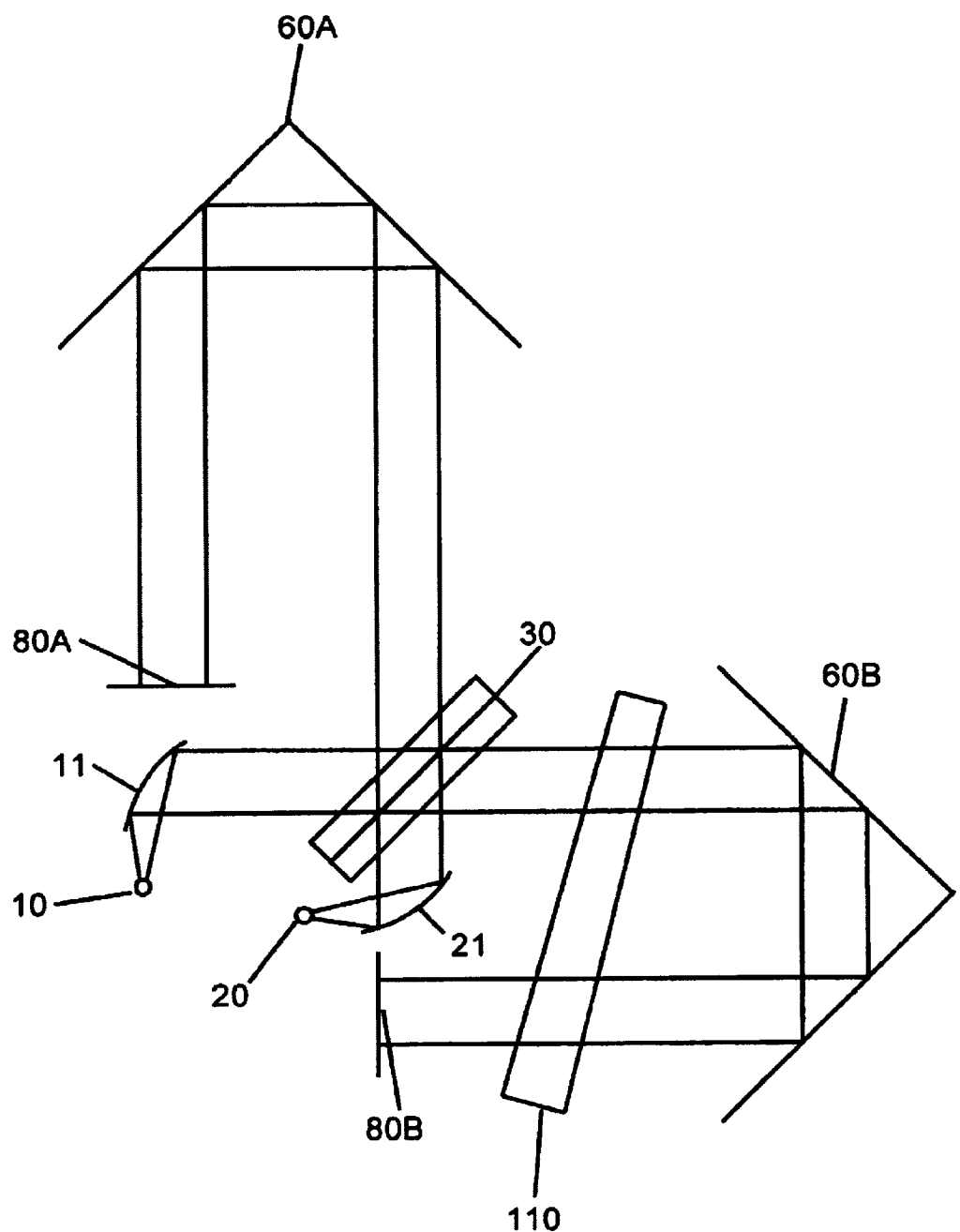
FIG. 4 shows a diagram of a modified Michelson interferometer design incorporating refractive path difference scanners.

FIG. 4 shows a diagram of a folded Michelson interferometer using a variation of an arrangement published by Steel many years ago. The advantage of passing the beam twice through the nutating disk 110 is that any variation of angle caused by a wedge angle between the two faces of the nutating disk (i.e., non-parallelism) will be cancelled by the double pass. Thus, the nutating disk may be of less exacting manufacture. The disadvantage is that the extra length of the interferometer arms generally decreases throughput. Another disadvantage is that the disk must be twice as large to accommodate two beam diameters on its surface.

If the angle between the nutating disk 110 and the beam is approximately 45 degrees then the variation of path difference with angle is nearly linear for small nutation or rotation angles. It is found that for a 6 mm thick KBr window having a refractive index of approximately 1.5, that the variation of path difference with angle for one disk with the beam passing in both directions is about 0.15 mm per degree of nutation (because the effect of 1 degree of nutation is −1 to +1 degree of tilt). If a disk is mounted in each arm, then the maximum optical path difference (and resolution) may be doubled.

If one disk is rotated at three times the rate of the other and is made appropriately thinner, then it may be used to linearize the change of optical path difference with respect to time. This idea may be furthered by adding two more disks and rotating them at 5 and 7 times the base rate to further linearize the change of optical path difference with respect to time. These disks would be correspondingly thinner. It is thought that the benefits of linearizing the scan are modest, given the signal processing approaches described herein and elsewhere.

It is understood that there will be dispersion in the scanning element or elements. If a refractive scanning element is used in only one arm of the interferometer, then the interference signal may be strongly chirped. Mattson has published a method (U.S. Pat. No. 5,491,551) for signal processing which accounts for a strongly chirped signal.

Figure 5:
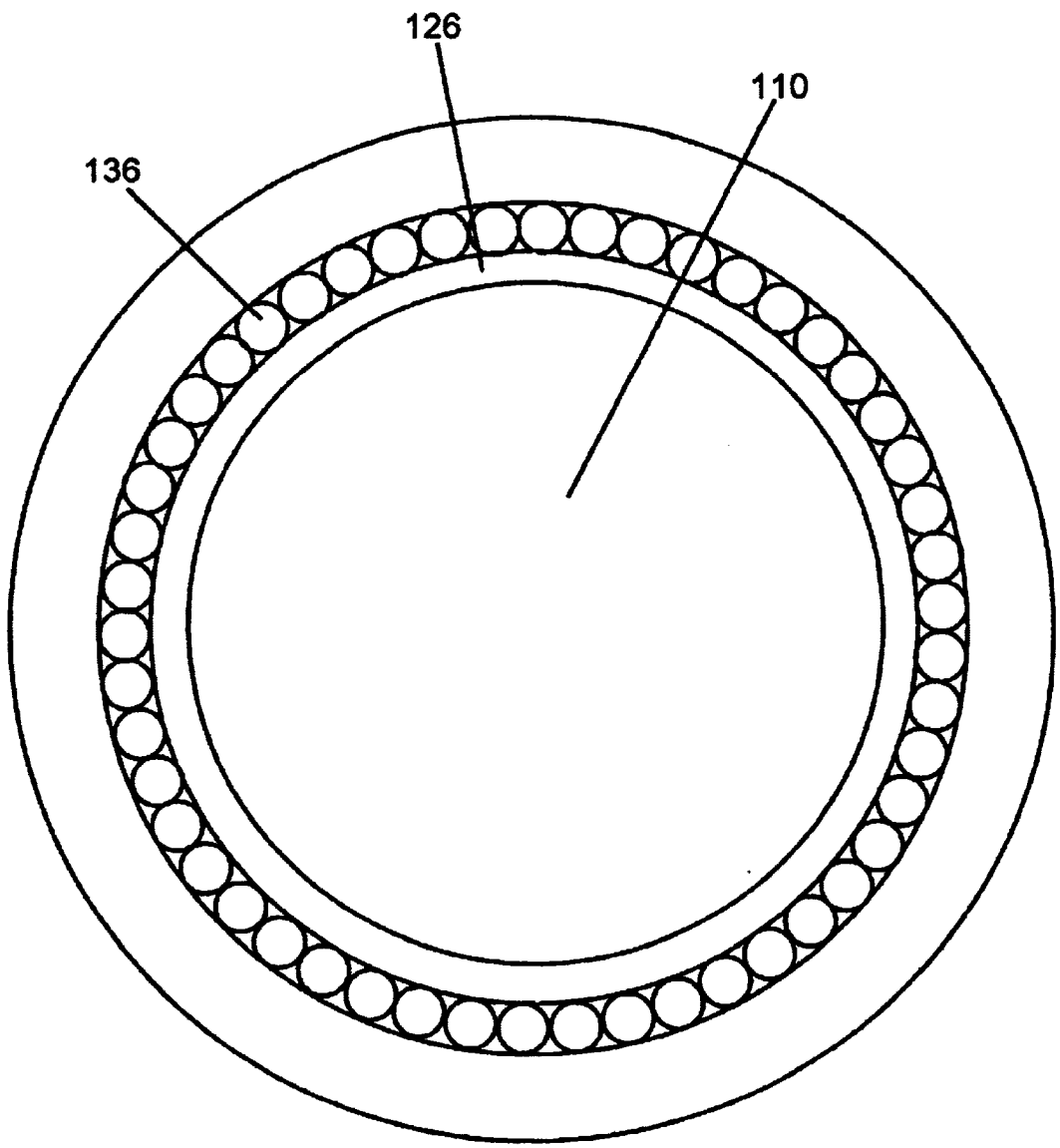
FIG. 5 shows a diagram of a bearing and support mechanism for producing a nutating motion of a refractive scanning element.

FIG. 5 shows two methods for supporting and spinning an assembly that includes a nutating disk mirror 110. The figure shows the housing 126 surrounded by a ball bearing 136. It is understood that the rotating assembly should be balanced by drilling material from the housing 126 so that during rapid rotation vibrational forces are minimized. The disk should be housed in a suitable material. Carbon fiber composites are preferred because of their lightweight, high stiffness and small coefficient of thermal expansion. Many other materials may be used for the same purpose. Titanium is thought to be a good choice because of its excellent mechanical properties and lightweight.

Signal Processing for Dispersion

A pending application by the author describes methods of signal processing which are also appropriate for use with refractively scanned interferometers. The general approach favored by the author is to record both the laser and infrared channels separately and simultaneously using suitable analog-to-digital converters or other technology such as that proposed by Mertz circa 1965. These ADC's 116 will be clocked from a common source so that they produce a set of matched simultaneous samples. An inverse transfer function may be applied to both channels to provide delay matching. The laser signal is then processed, preferably with a Hilbert transform or filter, to extract an accurate estimate of phase for each data point. The mirror position is proportional to this phase value. This set of data can be used together with the corresponding samples of the infrared channel to do either an unevenly-spaced Fourier transform (i.e., Lomb periodogram), or a spline or polynomial fit with subsequent conventional Fourier transform. Brault's method may also be used to produce excellent results. If the interferometer does not exhibit dispersion, the resulting spectral data are equivalent to those produced by conventional signal processing means. The signal processing steps detailed below will remove the effects of dispersion.

In the case of a refractively scanned interferometer, spectral distortion will result from dispersion. All refractive elements exhibit some dispersion. The spectral distortion can be readily predicted and compensated given that the temperature of the refractive scanning elements and the relationship between dispersion and temperature are known.

Doyle has found that it is not necessary to perform a correction for variation of temperature when using KBr as a refractive scanning element. Nevertheless, there are materials such as germanium for which it would be necessary. It is thought that for thermal and stability, the interferometer should be enclosed in a rugged metal housing. If the outside of the housing is even lightly insulated, the high thermal conductivity of the metal will tend to make the inside isothermal. In the preferred embodiment, the spectrometer has a small thermocouple or resistance temperature detector built into it so that the temperature of the metal shell can be continuously monitored. The thermal mass of the metal housing will insure that whatever temperature variations do occur are relatively slow so that corrections at each point in time will be accurate.

The form of the error, in the spectrum, caused by dispersion is distortion of the x-axis, i.e., the wavenumber axis. If there were no dispersion, this axis would be as accurate as the reference laser stability. In order to adjust the spacing of the x-axis, it is necessary to fit a polynomial or spline to the data. The polynomial is then evaluated at unevenly spaced points along the x-axis which correspond to a grid of evenly spaced points in the absence of dispersion. This correction may be repeated for each temperature. The dispersion curve can be determined from literature coefficients, or from a NIST-traceable wavenumber absorption standard. The traceable standard is preferred.

Figure 6:
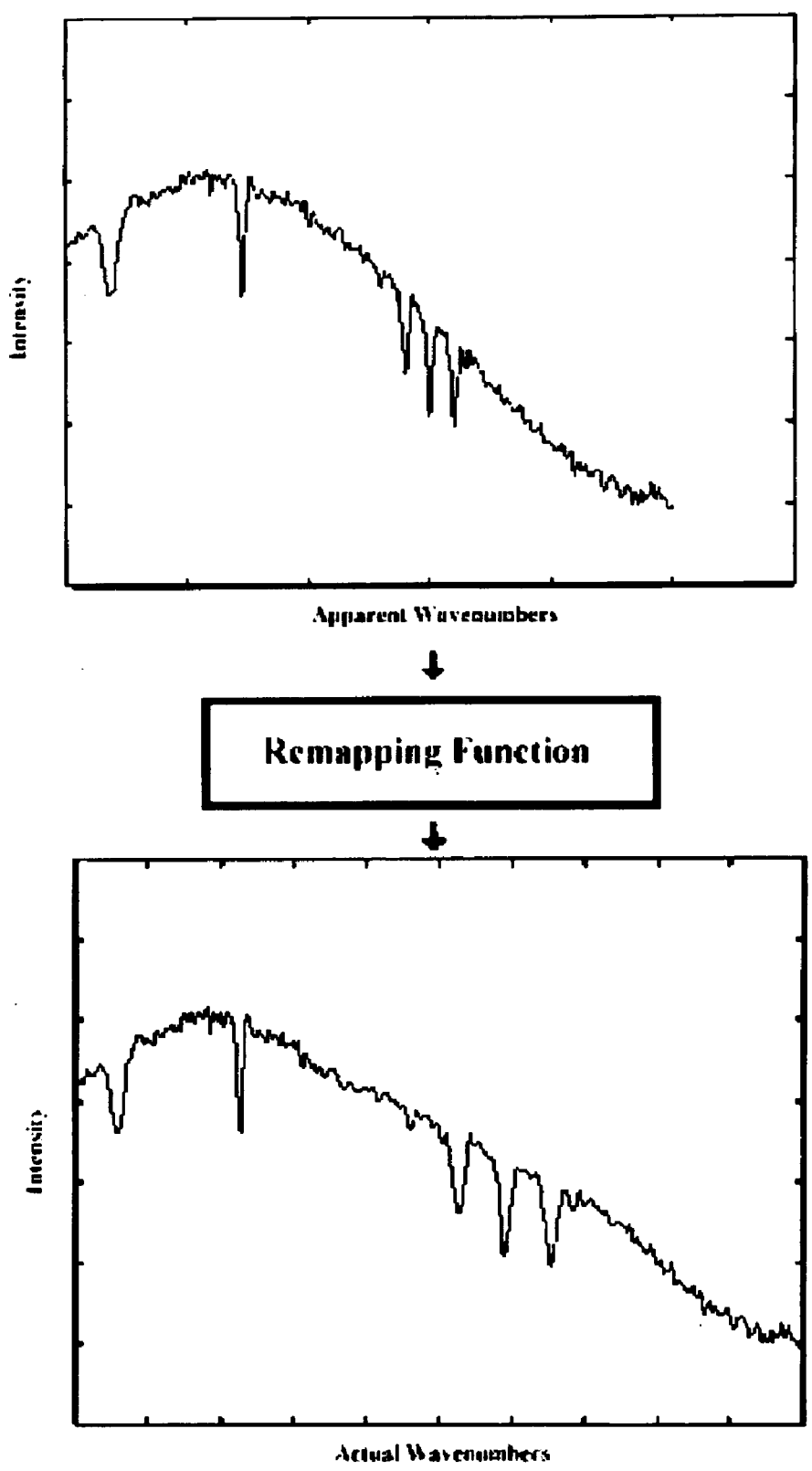
FIG. 6 shows a diagram of a remapping function applied to modify the apparent wavenumber spacing of the x-axis to actually wavenumber spacing.

FIG. 6 diagrams the distortion of the axis and shows schematically the appropriate signal processing steps to remove the distortion. Variations of the peaks on the spectrum are grossly exaggerated for clarity. The remapping function can be readily calculated from the dispersion curve for the refractive scanning material at the operating temperature. The laser data give a very accurate indication of the thickness of the material. The modulation frequency in the top trace of FIG. 6 is on a linear scale and is referenced. As the refractive index of the material increases, the modulation frequency increases in exact proportion. To produce the bottom trace on FIG. 6 it is only necessary to modify the x-axis of the top trace by applying the remapping function. The remapping function simply adjusts the value of each frequency point by dividing by the refractive index at that point to produce an accurate wavenumber value. This leaves the x-axis data points unevenly spaced. If an evenly spaced wavenumber axis is desired, as is the convention in chemometric analysis, the next step is to interpolate to find an evenly spaced set of values.

Signal Processing to Record and Invert Transfer Functions

To effect the type of signal processing described above most effectively, the transfer functions of the sample and reference (generally, infrared and laser) channels must be recorded and inverted. A previous disclosure describes the use of LED's to probe the transfer functions.

Figure 7:
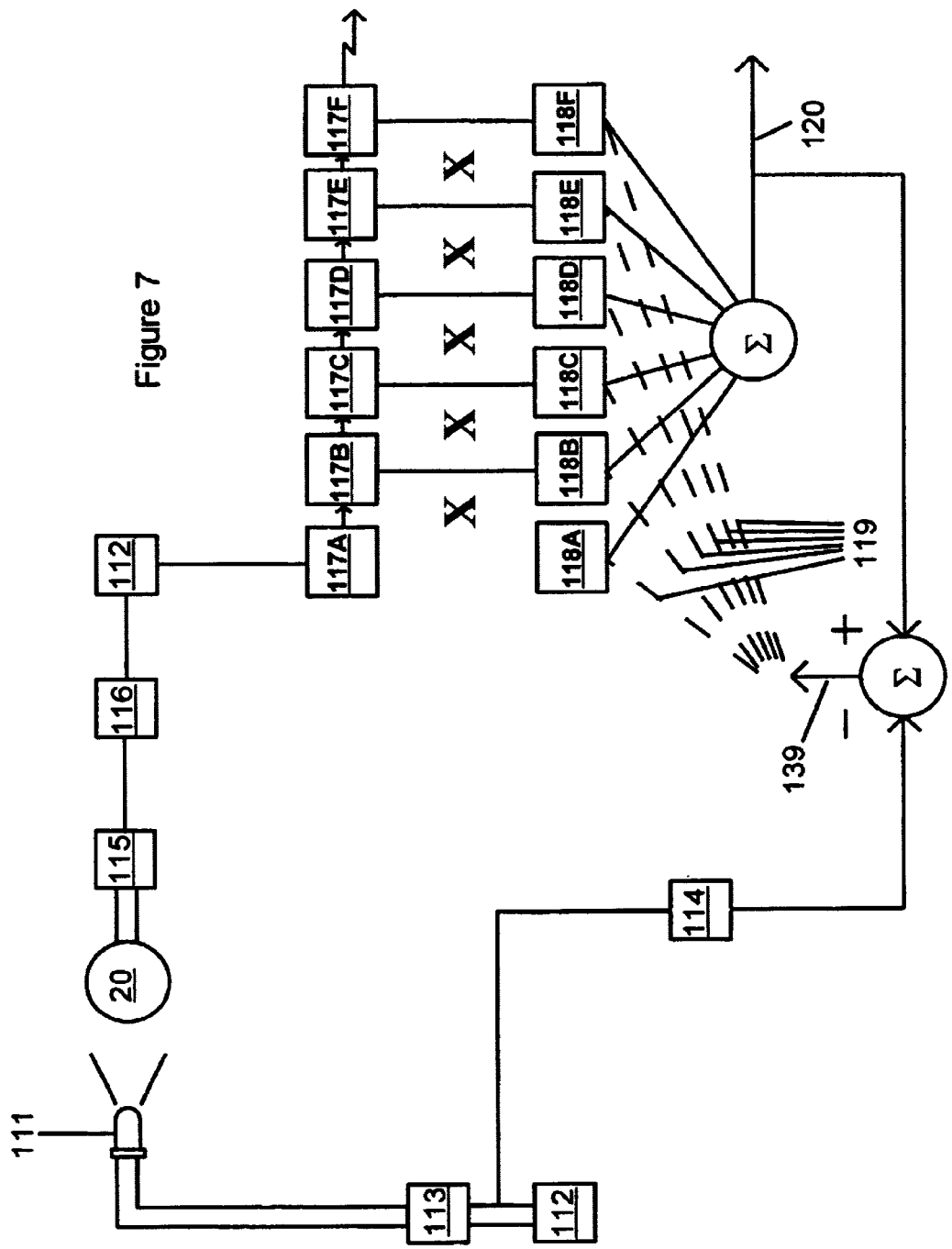
FIG. 7 shows a diagram of a signal processing chain that has the effect of recording the inverse transfer function of a detector signal chain.

FIG. 7 shows a powerful method of recording and simultaneously inverting the transfer functions of the sample and reference channels is to use two adaptive filters 117, 118, 139, 119, and 120. The adaptive filters described here may be of the finite-impulse response type describe by Widrow and Stearns (ISBN 0-13-004029-0). Each weight 118 may be updated for each iteration of the filter computation cycle. The adaptive filter outputs 120 are compared to delayed copies of the input signals driving the LEDs 111(assuming that the LEDs are operated in a region of linear response to their input signals). The error signal 139 for each iteration may be computed from the difference between the delayed version of the test signal 114 and the output of the filter 120. The error 139 is applied as feedback 119 to update the filter weight vector 118 by a small amount at each iteration. Thus, each adaptive filter 117, 118, 139, 119, and 120 will converge to the inverse transfer function of the input channel, including the constant delay 114 which is the same for both channels. The spectrometer should be controlled during the convergence time so that no spurious signals are introduced into the adaptive filter 117, 118, 139, 119, and 120. Once the filter 117, 118, 139, 119, and 120 is fully converged, it thought to be sufficient to provide brief periods for updating the filter weight vectors 118 to account for slow variation over time. These brief periods may occur between scans.

FIG. 7 details the approach. An LED 111 or other emitter excites the detector 20. In a typical spectrometer, there would be both a reference laser channel and an infrared signal channel. Thus, the signal processing detailed in FIG. 7 would typically appear twice in an actual system. A waveform is applied to drive an LED 111. The output of the LED 111 shines on the detector 20. The waveform may be calculated, as from a pseudorandom algorithm, or may be generated from a lookup table. A copy of the waveform that is applied to the LED 111 is delayed 114 by an amount sufficient that the corresponding output from the detector 20 has reached the midpoint of the filter delay vector 117. The output of the filter 120 is compared to the waveform that is applied to the LED 111 (or a linearized version of the waveform applied to the LED 111). The reason that a linearized version may be needed is that the LED 111 may have some non-linear response that can be precompensated by adjusting the input voltage/current to produce the desired output intensity waveform. In such as case, the input waveform differs slightly from the output of the LED 111. By comparing the output of the filter 120 to the delayed version of the input to the detector 20, the adaptive feedback which corrects the filter weight vector will force the filter 117, 118, 139, 119, and 120 to converge to compensate for the detector transfer function. The input waveform from the LED 111 must not have frequency components that lie outside the response range of the detector 20. If this condition is not met, the filter convergence problem will be ill-posed and the results unstable and inaccurate. This method would generally be applied between scans of an interferometer. During the time of scanning and data acquisition the filter weight vector 118 would remain constant. Because the detector 20 and preamp 115 transfer functions would usually change only slowly over time, it would not be necessary to rapidly update the inverse transfer function 118 unless adverse conditions are encountered. It is understood that the probing of the detector transfer functions would best be accomplished during times that the interferometer mirror is stopped between scans.

For probing the degree of saturation of the detector continuously during scanning, a different approach is required. Detector saturation can be readily monitored by exciting the LED 111 of FIG. 7 with a signal moderately higher in frequency than the highest frequency component expected in the signal or reference channel. In this case, the LED 111 is exciting the detector 20 simultaneously with the interferometric signal of interest. It is not thought that the reference channel generally requires compensation for saturation because the dynamic range of a sinusoidally modulated laser signal is quite small. In the composite signal, the higher frequency signal can then be demodulated to produce an estimate of the degree of saturation of the detector at each point in each scan. The magnitude of the recorded signal can then be modified for improved photometric accuracy by using the saturation information. To account for differences in the effect of saturation at different wavelengths multiple LED's can be used, each modulated with a different frequency so that the degree of saturation for a series of wavelengths can be simultaneously measured.

Figure 8:
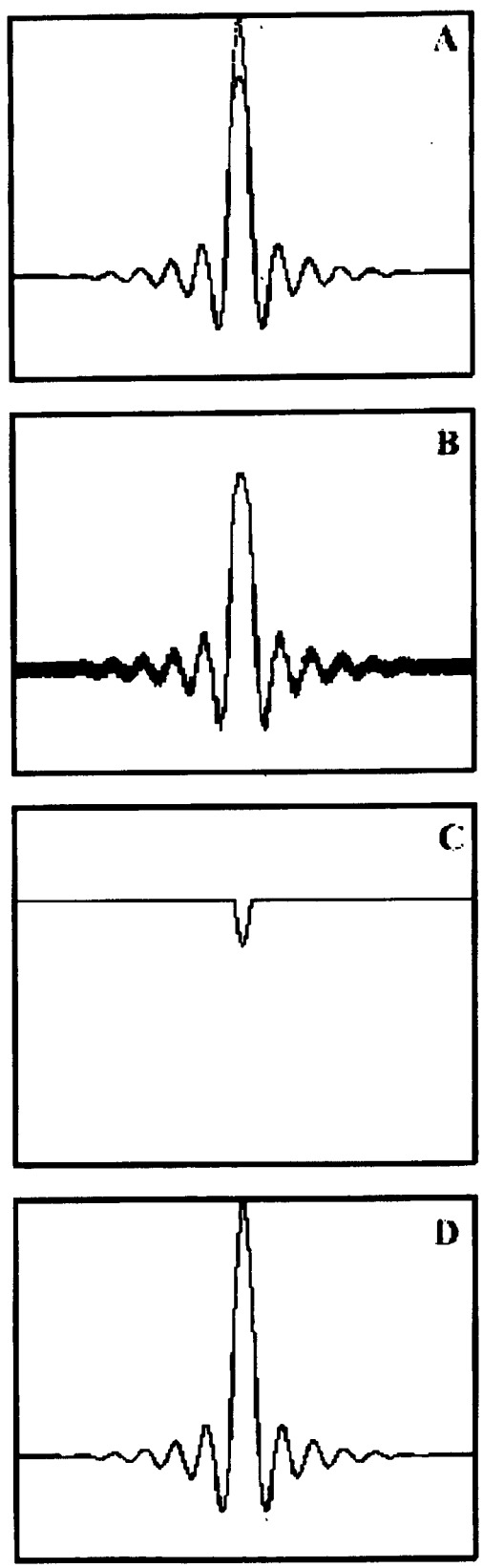
FIG. 8 shows a diagram of signals which are produced during a real-time measurement of detector saturation and correction for saturation.

FIG. 8 shows a diagram of 4 signals obtained when exciting the signal detector with both the interferometric signal and the probe signal. The top signal designated A shows an interference signal which has suffered from the effects of detector saturation. The dotted line indicates the intensity that should have been recorded. The trace B indicates the interferogram with a high frequency probe modulation present. The trace C indicates the demodulated intensity of the high frequency probe modulation that clearly dips at the location of the highest intensity in the interferogram. The degree of the dip very accurately captures the degree of saturation. Trace D represents the intensity of the interferogram after division by trace C. This is the corrected interferogram which has improved photometric accuracy.

LED's may be also be used to probe the transfer functions of the elements of an array detector. Silicon CCD arrays, mercury-cadmium telluride arrays, indium antimonide arrays, and a variety of other array detectors are used with spectrometers for imaging and other applications. Typically, these detectors produce an output proportional to the integrated intensity falling on them during a time interval. Thus, the time-dependence need not be probed. However, the non-ideal intensity response characteristics of these components may be probed and compensated on an element-by-element basis. These non-ideal characteristics include non-linearity and offset The output of the LED's or other emitters may be homogenized by passage through a diffuser, integrating sphere, light pipe, or other optical element to insure that each element of the array is equally illuminated. The probe radiation for each element may be modulated independently as discussed below, but is thought that use of equal illumination of the elements is a very practical method for probing non-uniformity.

An LED or other emission source is controlled by a computer processor which may be a DSP processor. The intensity can be accurately controlled in stepwise increments. By adjusting the intensity through a wide range, and recording the output of each detector element for each intensity, the gain, offset and non-linearity of each pixel can be separately calculated. When spectroscopic data are recorded, the transfer function of each element may be removed from the recorded data by correction for gain, offset and linearity of response using the recorded transfer functions of the detector pixels. The saturation of the detector can be probed by taking inerleaved frames from the detector with the LED on in one, and off in the next. This is analogous to the use of phase modulation of the inerferometer in step-scan imaging.

The use of phase modulation in an infrared spectrometer may be used to reject multiplicative noise of the type associated with source intensity variation. This method requires that an image frame be recorded while the interferometer mirror is at one extreme of its motion. This signal is subtracted from the frame recorded with the mirror at the other extreme of motion. This would usually be repeated several times at each interferometer step and the results averaged. This practice will greatly reduce the effect of multiplicative signal variations of all types.

LED's may be also be used to probe detector transfer functions of photoacoustic (PA) or photothermal (PT) detectors. PA and PT detectors are intended to be very sensitive to temperature variations caused by absorption of light. Unfortunately, they are also very sensitive to environmental disturbances as well as convection and other non-ideal characteristics of their components. LED's or other solid state emitters, either singly or in arrays, may be used to probe the instantaneous transfer function of the detector and each point within the detector sensitive area. Thus, changes in responsivity caused by temperature variation, aging, density fluctuations (convection) or other causes may be compensated in real time. The principal variation needed relative to the above discussion is that to probe different points in a photothemal or photoacoustic detection system simultaneously requires a multiplexed probe signal. For example, in the case of a photoacoustic sample that is mounted within a photoacoustic cell, a suitable approach according to the present invention is to modulate a probe beam which is impinged on the full area of the detector active area.

The probe beam can be conveniently modulated by the use of a mirror array of the general type discussed by Messerschmidt (U.S. Pat. No. 6,034,370) and Tague (U.S. Pat. No. 5,923,036). Alternatively, a suitable probe beam can be generated by an array of LED elements that are assembled with hybrid circuit or integrated circuit technology. In either case, the probe beam is be imaged onto the active area. Each point in the probe beam is then modulated with its own characteristic modulation pattern that may be a sinusoid of a particular frequency, or may be a modulation described by a Hadamard matrix. By demodulating the photoacoustic detector signal for each of the patterns contained in the probe beam, it would be possible to discern the local amplitude and phase response of the sample-gas-microphone coupling system. This is thought to be useful, because, particularly in step-scan Fourier-transform photoacoustic measurements, the variation of response over time can be source of spectral noise. By compensating these variations during data acquisition, much higher quality spectra can be measured in a much shorter time.

A source is collimated, then directed onto an array mirror device. The beam reflected from the array mirror device is directed into the photoacoustic sample chamber such that it illuminates the sample. By modulating each mirror pixel with a characteristic pattern, such as a sinusoid of known frequency and phase, it is possible to measure the amplitude and phase responses of the cell for each pixel independently. In the case of convection currents and hot spots that vary the temperature of the sample and the gas near it, it is thought that this information can be used to account for the variations in response. The composite signal from the detector, during a condition in which the response probing is active, but the input beam from a spectrometer is not active, is decomposed by Fourier transformation. As long as the probe signals are separated in frequency by more than the resolution of the Fourier transform, each probe amplitude and phase will be distinctly available. Ideally, all pixels are probed simultaneously so that information about the sample response is very dense. It is thought that the probing should be as quick as possible so that changes over short time scales can be compensated.

Etalon Standard for Reference Lasers

It would be very desirable to replace helium-neon lasers, which are typically used as frequency references for interferometry, with small, efficient semiconductor lasers. The power savings are up to 20 watts per laser replaced. This is a very important issue for portable interferometers. The waste heat generated by gas lasers has been determined to adversely affect the performance of some spectrometers. Unfortunately, for the most part, semiconductor lasers have a frequency stability on the order of parts per thousand, while the HeNe lasers have a frequency stability on the order of parts per million. The use of a small and inexpensive etalon (typically a quartz plate) to determine the absolute frequency of a laser is disclosed. An etalon with a 3 $cm^{-1}$ mode spacing may be useful, but smaller or larger spacings can also be used. Using an estimated refractive index of 1.5 would indicate an etalon thickness of about 111 microns. The etalon may be used with or without an array detector. The etalon may be placed anywhere in proximity to the interferometer, in the path from the laser to the laser detector.

Figure 9:
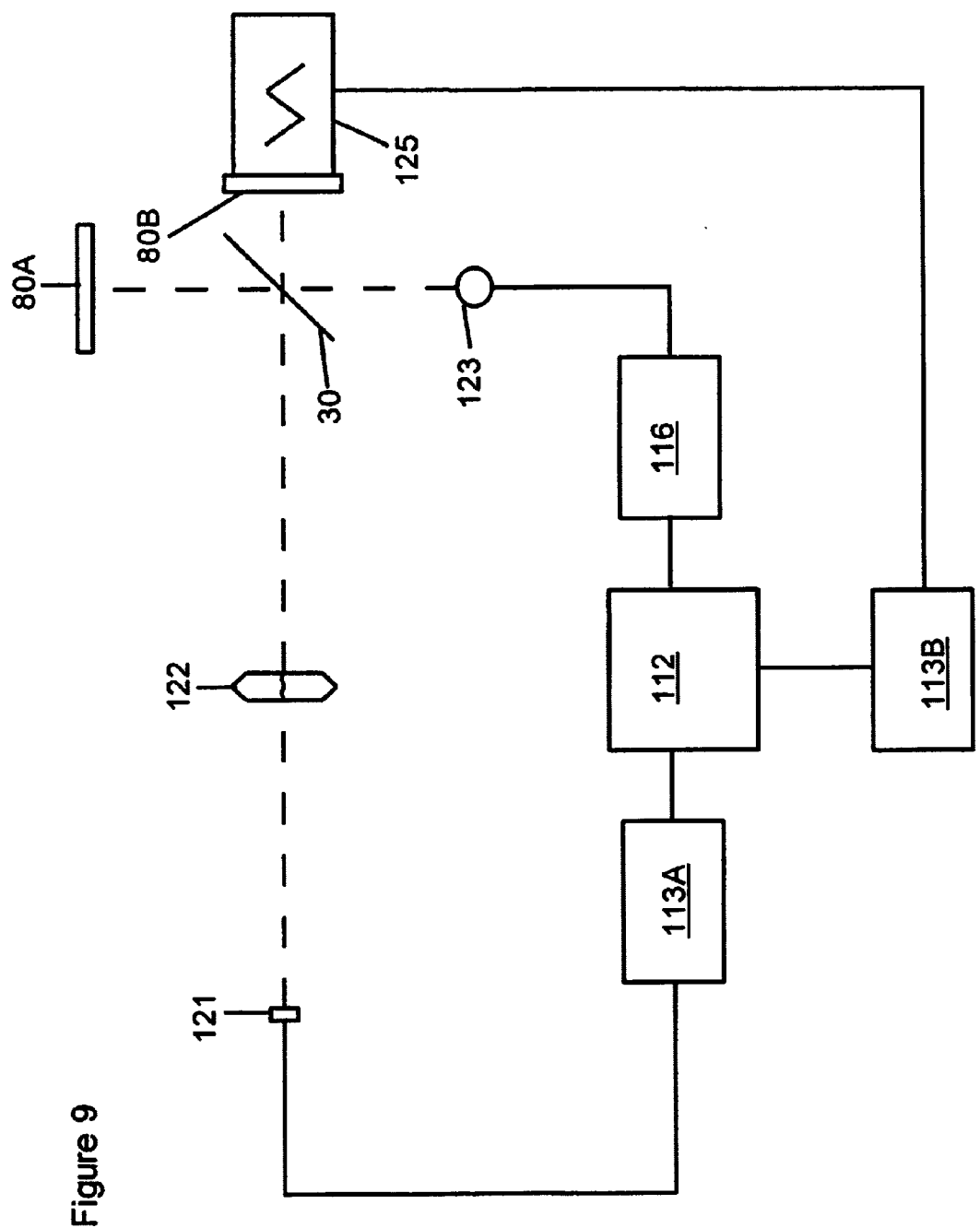
FIG. 9 shows a diagram of an arrangement which may be used to measure and optionally stabilize the wavelength of a tunable solid-state laser to render it an effective wavelength standard for interferometry.

FIG. 9 shows a schematic of the optical and electronic layout appropriate for using such an etalon 122 for fine control of the laser frequency. The source laser 121 is controlled by a digital-to-analog converter 113A which allows both a DC offset current to be applied, as well as an AC modulation current. The modulated output of the laser passes through an etalon 122 and then through the interferometer. The optical output of the interferometer which has been modulated by the static position of the interferometer mirrors 80A and 80B, as well as by passage through the etalon 122 is then sampled by an analog-to-digital converter circuit 112. The resulting digitized signal is then demodulated by the DSP 112 core which controls the overall spectrometer. The DSP 112 calculates any corrections to the laser DC current to maintain a constant wavelength for the reference laser. The DSP 112 also records the laser wavelength to use for correcting recorded interferometric data.

Choosing the mode spacing of the etalon 122 is a compromise between two conflicting criteria—the first being that the mode spacing be narrow enough that there would be significant intensity modulation when the wavelength is varied by current modulation, and the other being that the modes are sufficiently separated that there is no ambiguity as to which mode the laser begins in at startup. It is possible to use an independent reference to ascertain in which mode of the etalon 122 the laser 121 is operating. For example, the rotational lines of water are known to great precision and are often present in mid-infrared spectra. By calculating the position of the water lines, the laser wavelength can be very accurately determined.

For semiconductor lasers, one powerful approach is to modulate the current in the laser 121 to cause the wavelength to shift, and then decode the resulting intensity modulation to determine precisely the wavelength. A first order correction must first be applied to the data recorded from the output of the laser photodiode 123 or photodiodes. The reason for the correction is that the intensity of the laser will vary approximately linearly with applied current. The intensity of the laser may be monitored with a second photodiode so that the laser intensity can be completely divided out of the values determined from the photodiodes.

Many modulation approaches are possible—the modulation could be slow relative to the scanning modulation and done continuously during operation, or it could be done only between scans with a fairly high frequency. As the semiconductor laser current is modulated, the shifting wavelength will lead to an intensity modulation as the laser 121 moves over one or more etalon 122 modes. Different types of lasers will have different tuning ranges. If the current tuning can be done only over a small wavelength range (<<1 mode) then it is still possible to extract from the ratio of the fundamental and the first harmonic the exact location of the laser wavelength on the etalon modes. If the current tuning range is relatively large (on the order of 1 mode) then it is possible to drive it to an even or odd symmetry point on one of the modes and maintain it there continuously.

The waveforms that are produced by wavelength modulation are Bessel functions. The frequency components of the various Bessel functions are very sensitive indications of the exact point in the etalon mode that the laser frequency is positioned. The amplitude of the Bessel functions is also a sensitive gauge of the wavelength range of the tuning. By comparing the amplitudes and phases of the various harmonics it is possible to determine the laser wavelength with excellent precision. This approach is capable of holding or determining the laser position to at least $\frac{1}{1000}$ of a fringe, if not $\frac{1}{3000}$ of a fringe or better. This approach gives a solid-state laser comparable frequency stability performance to a HeNe. The only cost incurred for each additional unit is the etalon 122. In the spectrometer design preferred by the author, the semiconductor laser 121 is driven by a digital-to-analog channel 113A from the DSP 112 core, so no additional components would be required in the design. In the preferred design, the same DSP 112 core is connected to the photodiode 123 which detects the laser intensity as modulated by the interferometer. The additional frequency components which are produced by the various modulation schemes aimed at determining the laser frequency can be readily demodulated by the same DSP core 112. Since this DSP core 112, in the preferred design, also handle the interferometric data from the signal channel; any necessary corrections to the data can be readily recorded.

Figure 10:
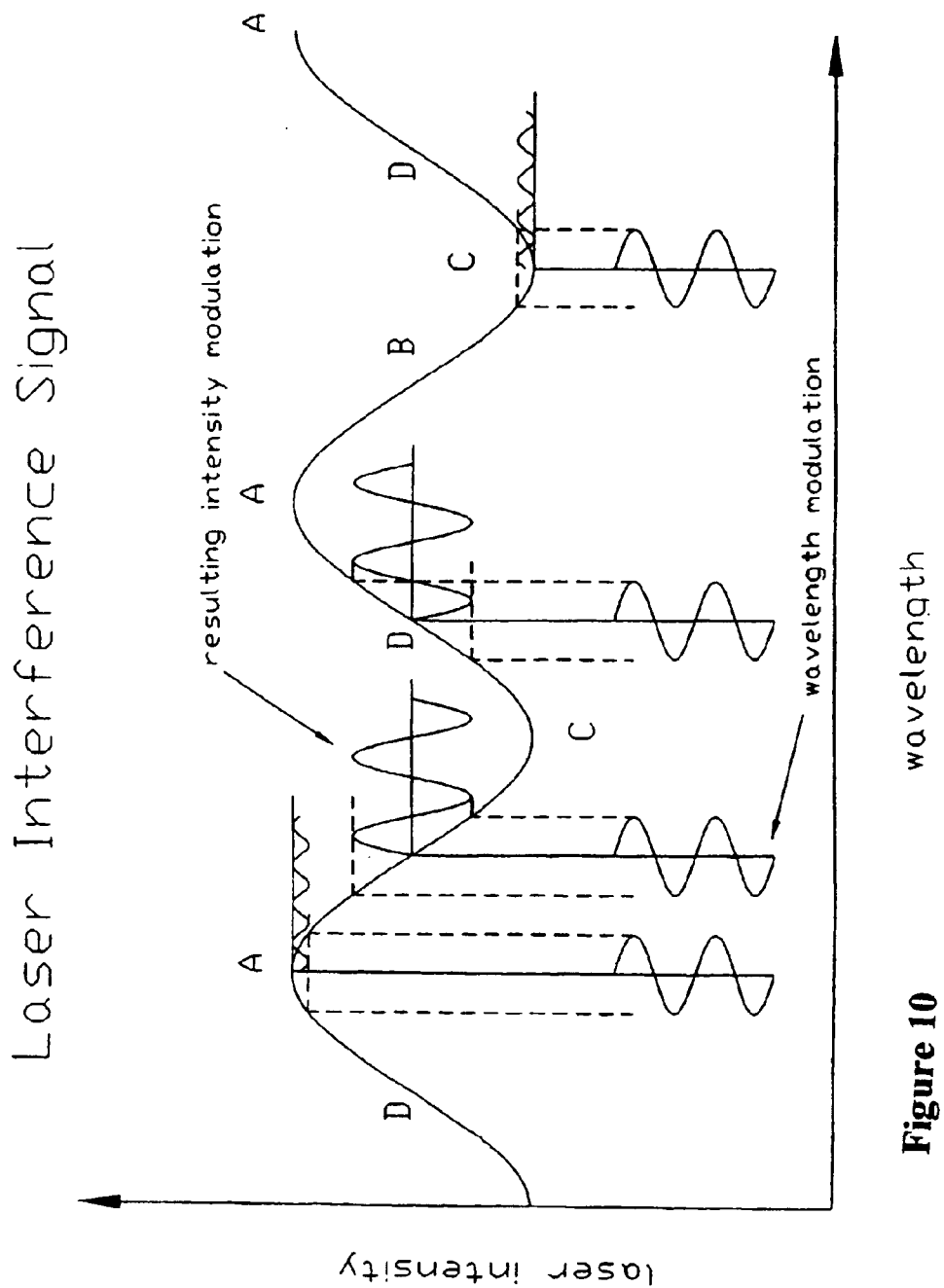
FIG. 10 shows a diagram of signal produced during measurement of the wavelength of a tunable solid state laser.

FIG. 10 shows the waveforms that may be expected at different points in the etalon modes. For example, there are four points of pure symmetry within one cycle of the mode spacing. These points are the positive and negative extrema (A and C, respectively), which have purely even symmetry. That is, the etalon modes viewed from this point are symmetric. The two points of purely odd symmetry are the zero crossings, B and D.

Two important approaches which are thought to be complementary to the above description may also be used with lasers which cannot be conveniently wavelength modulated by current modulation. These are piezoelectric modulation of the etalon 122 thickness, which will produce a similar effect. Another effective method to provide modulation for detection of wavelength is to use an electro-optic modulator at the output of the laser. It is thought that a standard HeNe which drifts by approximately a few ppm can be further improved for much less expense than the cost of a stabilized laser by the use of either of these methods. These methods are also applicable to stabilization or determination of absolute frequency of solid-state lasers of various types, including semiconductor lasers. With gas lasers, the initial frequency will be known to much higher precision than the semiconductor laser. Thus, the mode spacings of an etalon may be much narrower so that the frequency determination is correspondingly more accurate.

The sensitivity to misalignment (i.e., non-perpendicularity of the etalon) is quite acceptable up to 0.1 degree where it reaches about 15 ppm/degree. At 1 degree the sensitivity is 10 times larger and completely unacceptable. Thus, the etalon 122 must be precision mounted with respect to the semiconductor laser 121. If the etalon 122 is mounted in such a way that the angle can be modulated, then it is quite straightforward to modulating the etalon tilt to find a minimum in the thickness. The variation of refractive index and thickness with temperature can be readily corrected if the system temperature is probed as described herein.

Optical Nulling Interferometry

Optical subtraction, or nulling, of interferometric signals has been known for many years as practiced and published by Griffiths, Mattson (U.S. Pat. No. 4,999,010) and others. The main advantage of optical subtraction is that the dynamic range of the measured interferogram is reduced. Dynamic range is particularly important in the near-infrared spectral region where the extra brightness of blackbody sources and the higher D* of detectors can make the dynamic range of interferograms considerably larger than 1 million:1. The performance of analog-to-digital converters was an important issue for mid-infrared spectral measurements for many years. Recently the performance of ADC's, particularly those of the delta sigma type, has reached the point that it can generally be disregarded for mid-IR measurements. However, the measurements made in the near-IR spectral region using interferometers can routinely achieve optical SNR levels well above 1 million:1 up to the range of 1 billion:1. Presently no ADCs can achieve this level of performance. It is impossible using current technology to digitize some interferometric NIR optical signals without seriously degrading the signal quality.

The use of permanently-aligned, tilt-compensated four-port (two-input, two-output) interferometers to perform optical subtraction of signals is disclosed. The two inputs are also out of phase, so that if a suitable comparison source (or sample) can be found, then the difference between the inputs can be nulled. An example of a suitable standard would be a pharmaceutical tablet which is known to be good. Such a tablet would be a suitable standard for inspecting other pharmaceutical tablets for quality control reasons. By using a near infrared probe beam it would be possible to obtain the chemical signature of each tablet, thereby verifying the composition as it passed by on a conveyor-belt or was loaded into containers. Such quality control would be particularly useful in cases where more than one type of pill was produced at the production facility. For optical subtraction, the ideal sample 142B would be a pill or tablet of known composition. When a tablet 142A of equal composition was position in the other beam, the output signal would null. If a tablet of different composition were placed in the probe beam, a large difference signal would be observed. Other examples of suitable samples 142A and 142B for comparison might include different regions of the ground in optical remote sensing or a piece of tissue known to be healthy in the case of medical diagnostics.

In the past, the main problem with optical subtraction interferometry has been the extreme sensitivity to alignment of the interferometer components. Several disclosures have provided interferometers which are immune to small misalignments of their components, but it is thought that no previous disclosure has addressed the issue of providing an optical subtraction or optical nulling interferometer which is immune to minor misalignment of the components. The present disclosure extends these ideas to the problem of optical subtraction by showing arrangements of interferometric components which are intrinsically and optically tilt-compensated in much the same way as the designs disclosed by Woodruff, Turner, and others.

Electronic subtraction of the signals from two different detectors is analogous to direct optical subtraction and is a practical and useful alternative, also known for many years. Generally, the two outputs must be out of phase for either type of subtraction to be useful.

Figure 11:
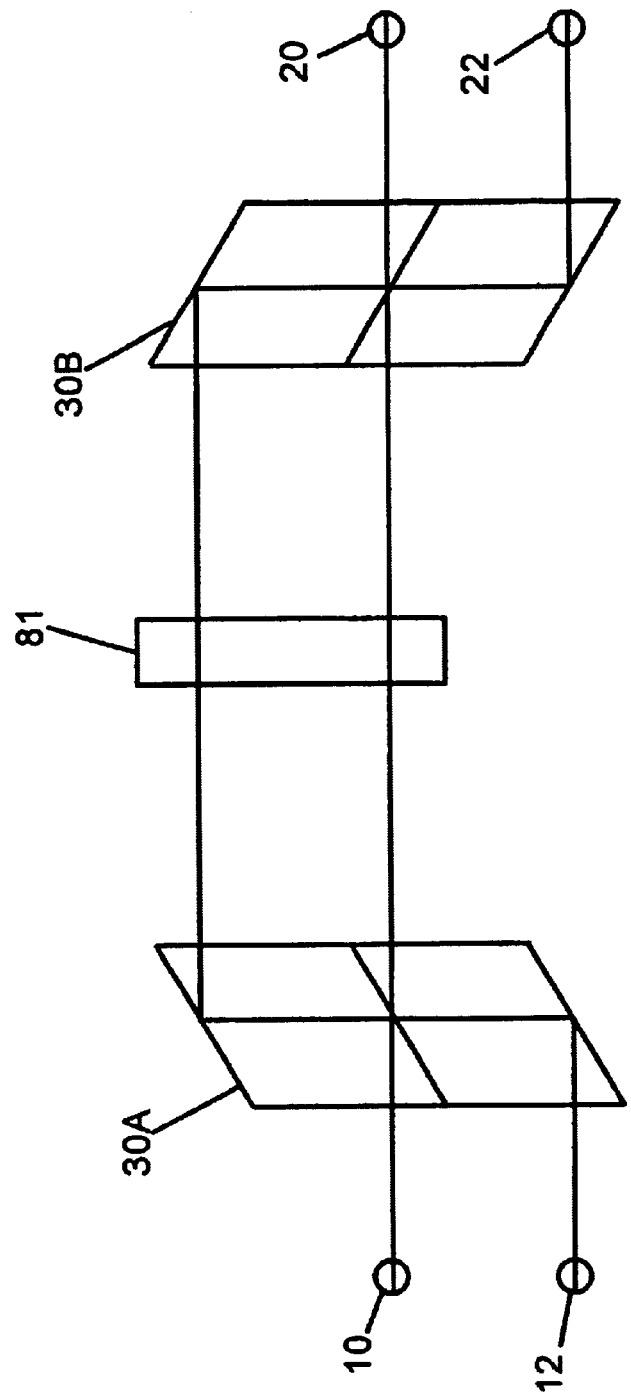
FIG. 11 shows a diagram of a permanently-aligned, tilt-compensated four-port interferometer.
Figure 12:
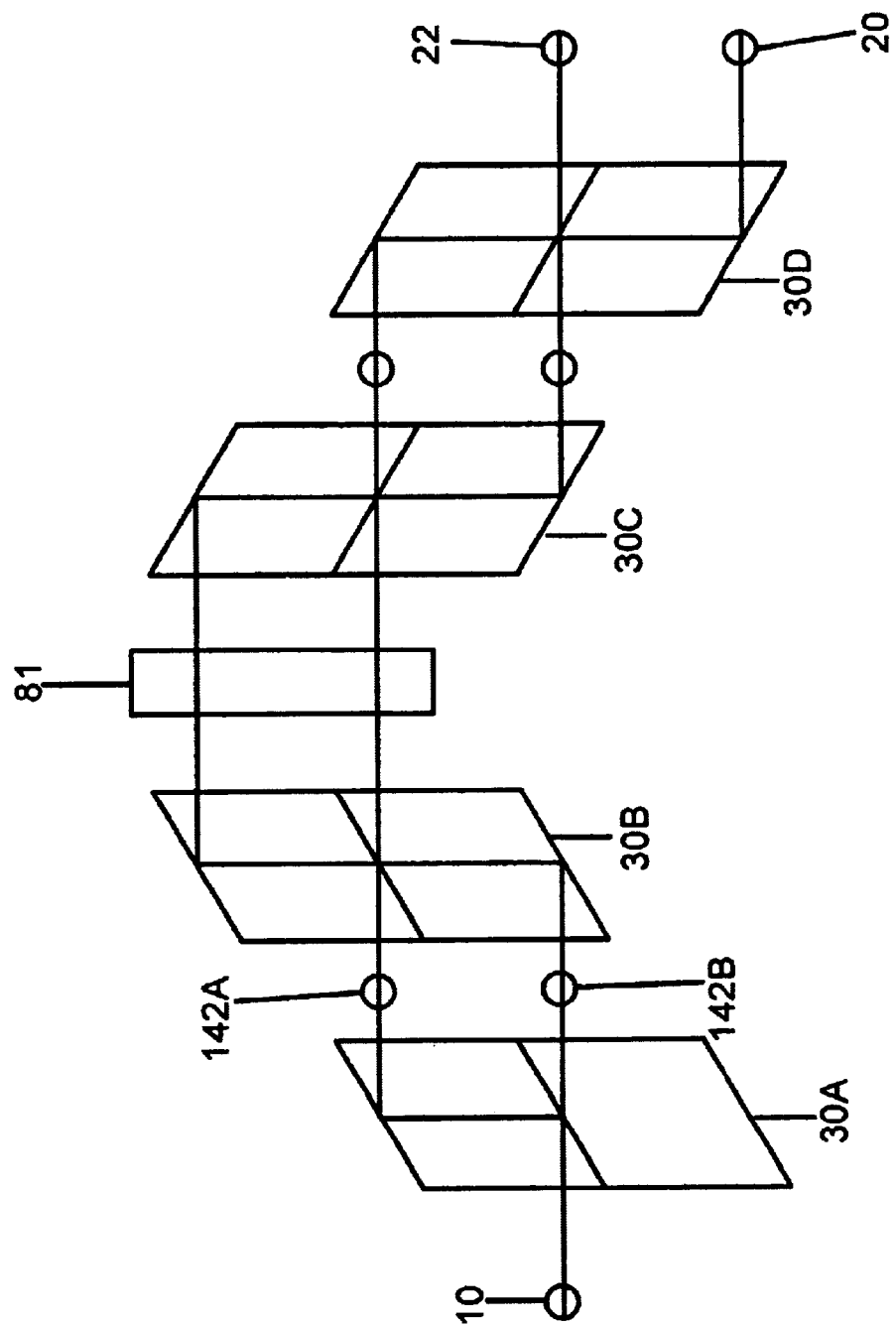
FIG. 12 shows a diagram of a permanently-aligned, tilt-compensated four-port interferometer with both inputs derived from a common source, and the outputs recombined to effect optical subtraction.
Figure 13:
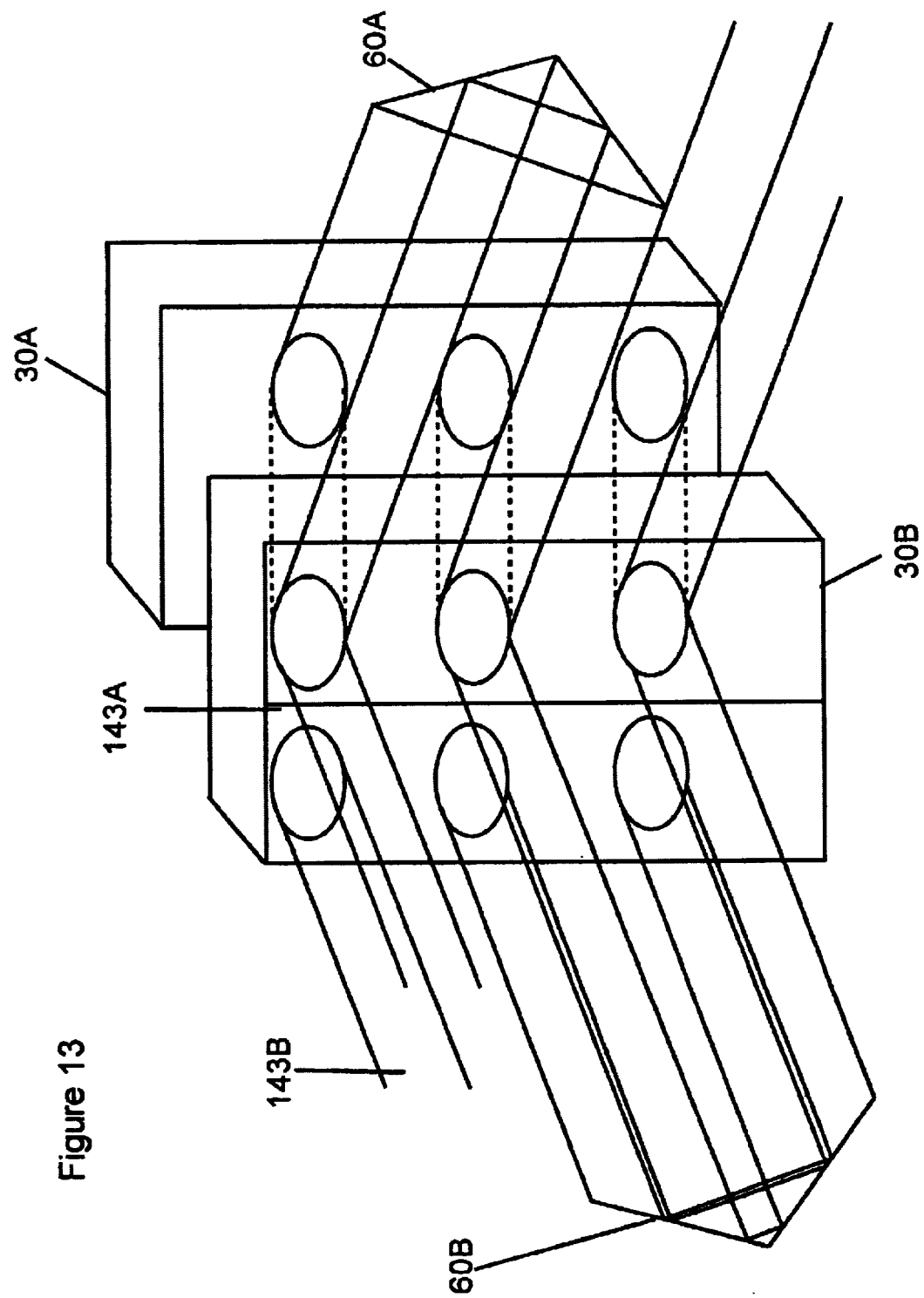
FIG. 13 shows an alternate geometry to that of FIG. 12 in which the functions of the separate beamsplitters and combiners are done by a single assembly.
Figure 14:
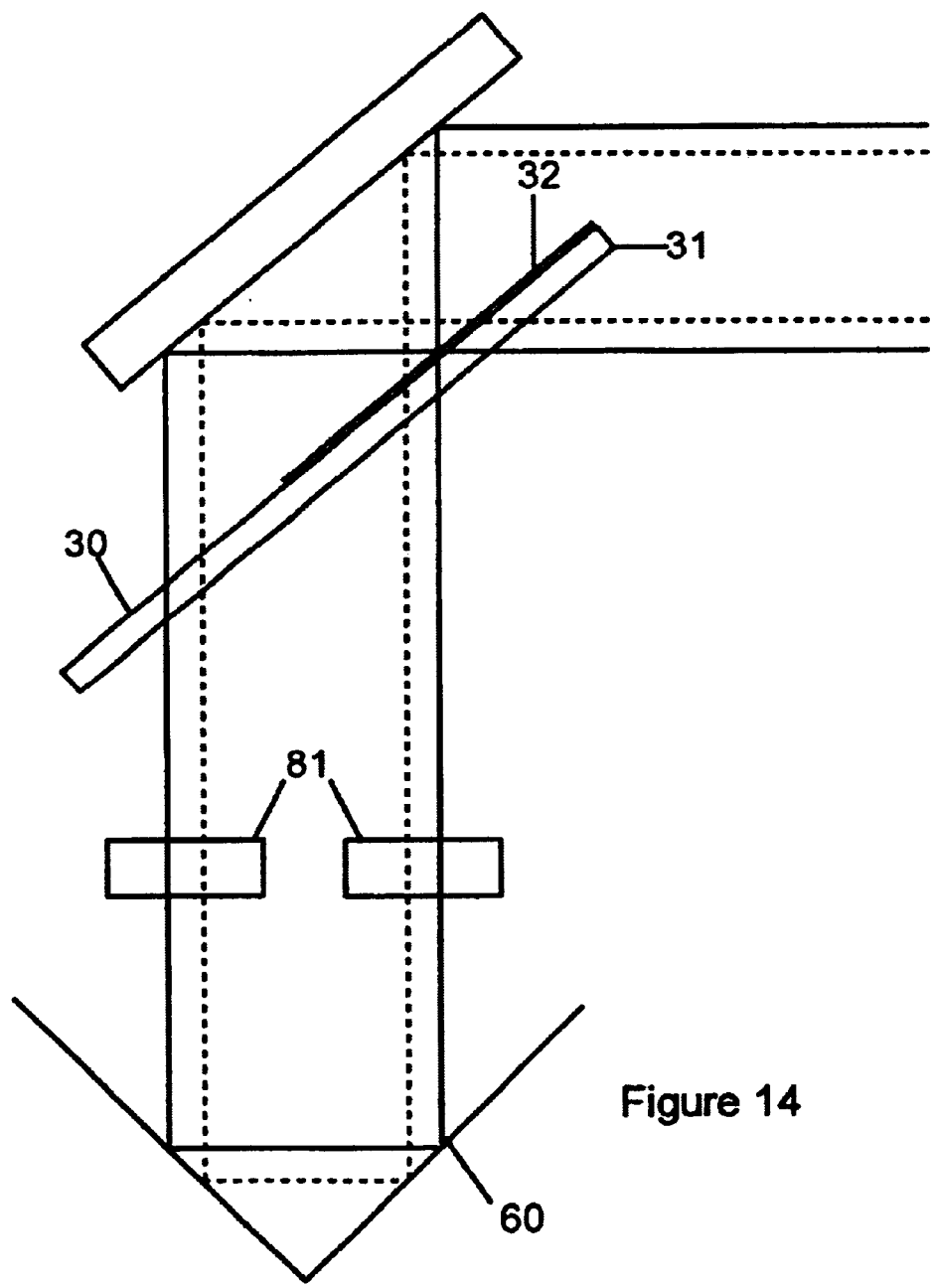
FIG. 14 shows a diagram of a four-port interferometer according to the approach of FIG. 13.

FIG. 11 shows a type of four port interferometer which is constructed from a monolithic beamsplitter 30A and monolithic beam combiner 30B elements to achieve permanent alignment. It will be appreciated by those skilled in the art that the path of the two beams from 10 and 12 will exactly coincide at 20 and 22 if the two blocks are made from the same thickness of material—independent of the exact tilt angles of the splitter and combiner. The two input beams from 10 and 12 pass through to the two outputs which are sampled by 20 and 22. The signals from these detector elements are amplified and subtracted electronically. If a subtraction succeeds in reducing the dynamic range of the interference signal by a factor of 10, it is roughly equivalent to gaining 3 bits of ADC performance. If the dynamic range can be reduced by a factor of 100, then slight more than 6 bits of ADC performance are gained. Currently, at audio frequencies, the best ADCs have about 24 bits of performance, with a dynamic range on the order of 1 million:1. To gain one or two orders of magnitude in performance is very significant improvement, and will continue to be until the SNR performance of ADCs has reached the point that the entire useful dynamic range of interferometric optical signals can be recorded.

FIGS. 11, 12, 13 and 14 show diagrams of four-port interferometers which are intrinsically immune to small misalignments of the components. The outputs may be sampled by two detectors 20 and 22 and subtracted, as above, or they may be recombined 143A and 143B, and then sampled by a single detector 20. For all three of these interferometers, to maintain optical alignment, the optical path difference must be scanned without introducing any tilt or shear into the beams. This is not a trivial constraint and the ramifications will be expounded below.

An alternative to subtracting the signals from two different detectors 20 and 22 is to record or generate a facsimile of the average interferogram and subtract it electronically from each subsequent interferogram. At any point in time, the performance of available digital-to-analog converters is generally better than the performance of available analog-to-digital converters by several bits. Thus, the ability to playback a facsimile of an interferogram is sufficiently better than the ability to digitize the interferogram that subtraction of the facsimile would represent a significant improvement over the present state-of-the-art. Preferably, the average interferogram would be very accurately measured by recording a long series of interferograms, thereby reducing by averaging the imperfections of the analog-to-digital converter. The playback of the facsimile would be triggered by the fringe count of the reference laser so that it was very accurately placed in time and retardation relative to the signal being nulled.

Figure 15:
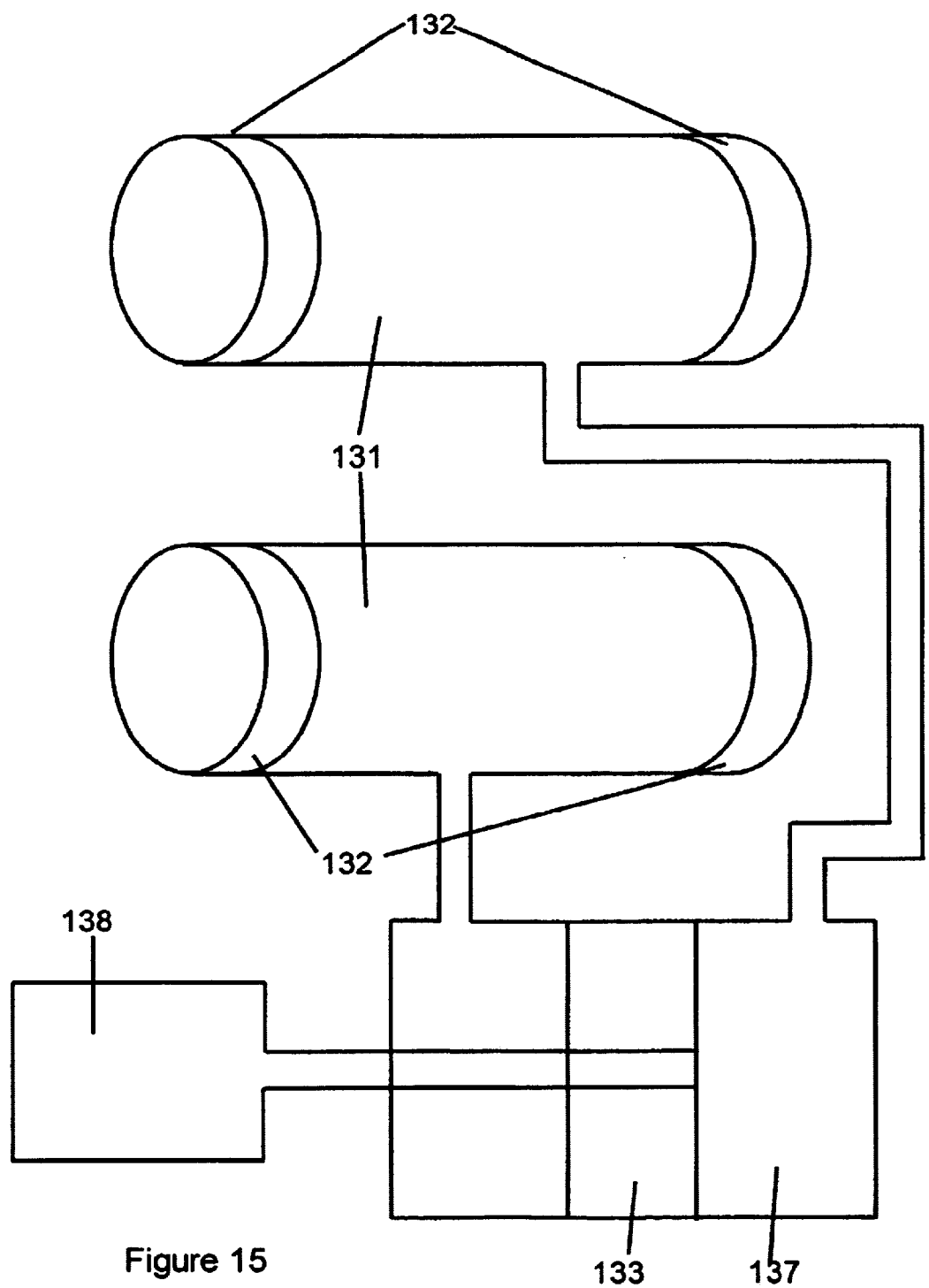
FIG. 15 shows a diagram of an optical path difference scanner that uses gas pressure to effect a variable optical delay.

The interferometers in FIGS. 11, 12, 13, and 14 depend on parallel reflector assemblies, or a related design may be constructed from the type of assembly described relative to FIG. 1. Because no tilt or shear can be introduced into either arm of such an interferometer, a preferred method of refractive path difference scanning uses the change of refractive index of a gas in cell 131. A gas cell 131 may be placed in each arm, and then the pressure in one cell may be increased while the pressure in the other is decreased. It is anticipated that in the relatively near future, electro-optic scanning of interferometer path difference will become feasible. At the time of this writing, the available materials and configurations can only produce very small path differences. As this situation changes in the future, it is expected that the gas cells and other optical path difference scanners disclosed here may be replaced with the corresponding electro-optic components. FIG. 15 shows a suitable gas cell 131 arrangement with a piston 133 for changing the pressures in the two cells.

It is thought that there are several gases which are appropriate for use in optical path difference scanner by pressure change. Xenon is attractive because it is completely inert and has a high refractive index which means that the pressure need not be changed as much to effect the same difference in path. It is thought that pressure changes of approximately 100 atmospheres with a path length through the gas of an inch would be useful. If the path through the gas is longer, then the pressure change can be reduced. Nitrogen is also an attractive gas for opd scanning because it is inexpensive and inert. The two gas cells 131 in FIG. 15 are connected such that amount of gas in either cell may be varied by actuating the piston 133. The two gas cells 131 have suitable windows 132 so that the beams may pass through unobstructed. By varying the pressure through the actuator mechanism 138, the optical path of an interferometer may be scanned. This approach is known for small path differences. The utility of it here is that the opd must be scanned without introducing any tilt or shear in the beams.

Figure 16:
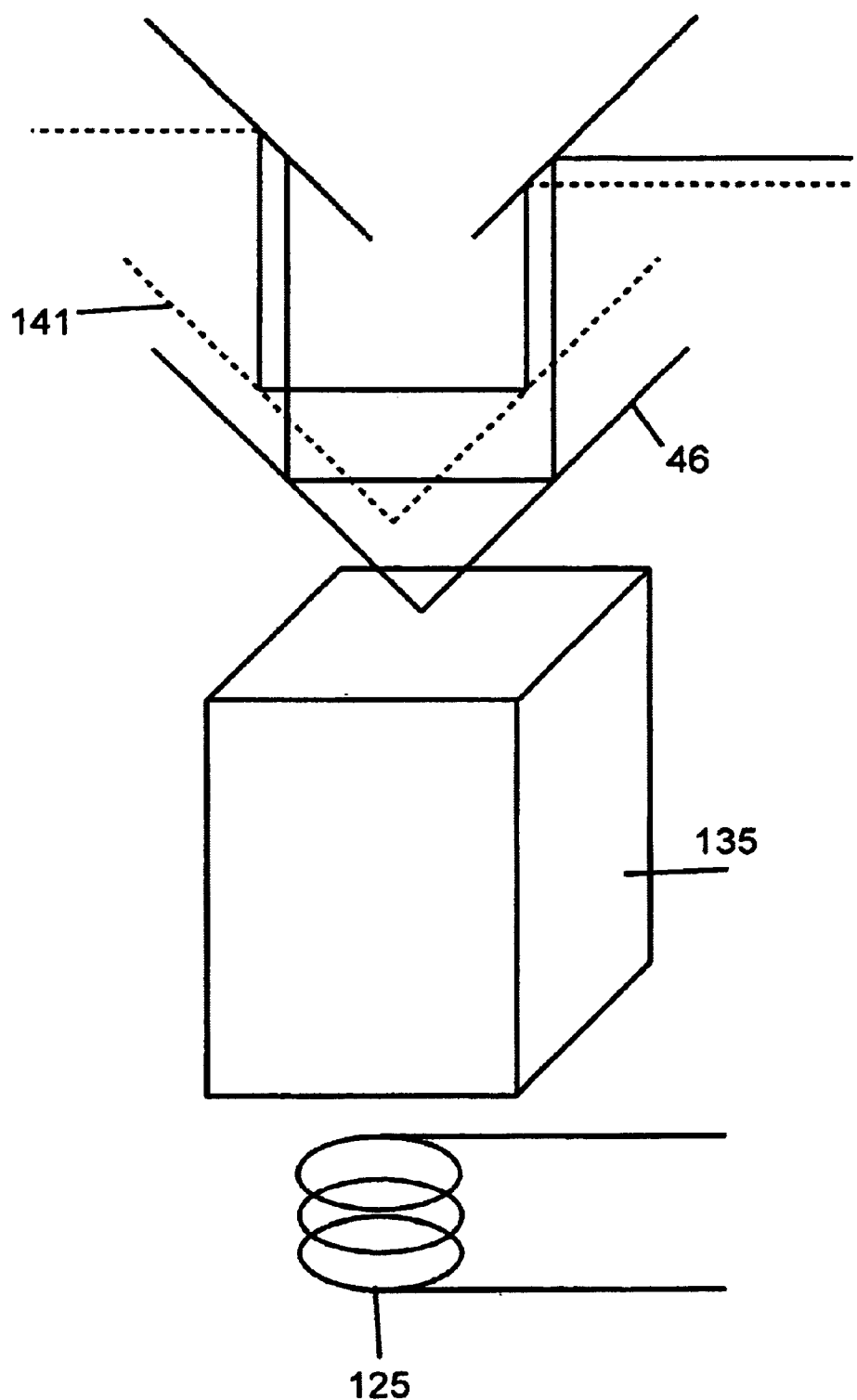
FIG. 16 shows a diagram of an optical path difference scanner that uses an airbearing assembly to avoid shear alignment errors.

FIG. 16 shows an arrangement with a roof reflector 46 supported by an air bearing 135 and driven by a solenoid coil 125. The precision of the air bearing 135 is required in this case because the optical alignment is not completely compensated as it is in the other components, or when scanning with the gas cell arrangement. For clarity, FIG. 16 does not show two roof reflectors. The second would be placed behind the first and is generally indicated by the dotted line 141. One is used for each of the beams for which optical path is to be scanned. This optical arrangement called "optical path difference scanner" can be inserted at several points in the beam path. There are several types of optical path difference scanners that can be used with the basic interferometers of FIGS. 11, 12, 13, and 14. Unfortunately, the refractive scanners of the nutating disk type cannot be used because they cause a shift in the beam. In the interferometer of FIG. 1, the shift is undone by a second pass through the disk in the reverse direction. In a four-port interferometer, the beam cannot go back on itself because it would lead to degeneracy in the ports—that is, it would be a two-port interferometer.

Other suitable path difference scanners can be constructed using combinations of mechanically stable components such as air bearing drives, cube corner reflectors and roof reflectors. Numerous other methods for scanning the opd without introducing tilt or shear may be combined with the devices disclosed herein.

The principles, embodiments and modes of operation of the present inventions have been set forth in the foregoing provisional specification. The embodiments disclosed herein should be interpreted as illustrating the present invention and not as restricting it. The foregoing disclosure is not intended to limit the range available to a person of ordinary skill in the art in any way, but rather to expand the range in ways not previously considered. Numerous variations and changes can be made to the foregoing illustrative embodiments without departing from the scope and spirit of the present inventions.

What is claimed is:

1. A spectrometer, comprising:
   a source of a primary beam of radiant energy;
   a beamsplitter fixed in relation to the primary beam, for dividing primary beam into at least first and second energy beams which follow first and second optical paths;
   a filter for modifying a laser modulation;
   a vertical cavity surface emitting reference laser coupled to the spectrometer and to the filter;
   a current for tuning the laser;
   at least one return reflector for reflecting the first beam back to the beamsplitter;
   at least one radiant energy detector; and
   a control, data acquisition and processing electronic system.

2. The spectrometer of claim 1 where the filter is an etalon.

3. The spectrometer of claim 1 where the vertical cavity surface emitting laser has a linewidth of less than one wavenumber.

4. The spectrometer of claim 1 where the signal generated by the vertical cavity surface emitting reference laser is demodulated.

5. The spectrometer of claim 1 wherein the detector further comprises a transfer function and wherein an additional source of radiant energy is used to probe the transfer function of the detector.

6. The spectrometer of claim 1 wherein the detector further comprises a transfer function and the transfer function of the detector is inverted by the use of an adaptive filter.

7. The spectrometer of claim 1 where the radiation detector detects an optically subtracted beam.

8. The spectrometer of claim 1 further comprising an additional source of radiant energy acting as a signal probe providing a response, and wherein the detector further comprises a detector signal, and whereby the detector signal is modified by the control, data acquisition and processing electronic system to correct for nonlinear response using the response to the probe signal.

* * * * *